United States Patent
Bai et al.

(10) Patent No.: US 9,930,581 B2
(45) Date of Patent: Mar. 27, 2018

(54) ADDRESSING COMMUNICATION FAILURE IN MULTIPLE CONNECTION SYSTEMS

(71) Applicant: Avago Technologies General IP (Singapore) Pte. Ltd., Singapore (SG)

(72) Inventors: Wei Bai, Beijing (CN); Jing Han, Beijing (CN); Na Wei, Beijing (CN); Haiming Wang, Beijing (CN); Lili Zhang, Beijing (CN); Xinying Gao, Beijing (CN); Pengfei Sun, Beijing (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 187 days.

(21) Appl. No.: 14/761,430

(22) PCT Filed: Jan. 22, 2013

(86) PCT No.: PCT/CN2013/070838
§ 371 (c)(1),
(2) Date: Jul. 16, 2015

(87) PCT Pub. No.: WO2014/113919
PCT Pub. Date: Jul. 31, 2014

(65) Prior Publication Data
US 2015/0365854 A1    Dec. 17, 2015

(51) Int. Cl.
H04W 84/04    (2009.01)
H04W 36/00    (2009.01)
H04W 76/02    (2009.01)

(52) U.S. Cl.
CPC ..... H04W 36/0055 (2013.01); H04W 76/028 (2013.01)

(58) Field of Classification Search
CPC .............. H04W 36/0055; H04W 76/028
See application file for complete search history.

(56) References Cited

U.S. PATENT DOCUMENTS

| | | | |
|---|---|---|---|
| 9,621,308 B2* | 4/2017 | Krishnamurthy | H04L 1/203 |
| 2010/0093358 A1* | 4/2010 | Cheong | H04W 36/0055 455/444 |

(Continued)

FOREIGN PATENT DOCUMENTS

| | | |
|---|---|---|
| CN | 102026316 | 4/2011 |
| CN | 102076038 | 5/2011 |

(Continued)

OTHER PUBLICATIONS

International Search Report for PCT/CN2013/070838 dated Oct. 24, 2013.

(Continued)

*Primary Examiner* — Jay P Patel
(74) *Attorney, Agent, or Firm* — Foley & Lardner LLP

(57) ABSTRACT

Systems and techniques for link failure management in multiple connection systems. Upon detection of a link failure with a local area base station during a dual connection mode in which the user device is connected to a macro base station and a local area base station, a user device sends a failure indication and a measurement results report for serving and neighboring base stations to its serving macro base station, and selects a response to the failure based at least in part on evaluation information received from the macro base station. Upon detection of a link failure with a macro base station, the user device determines whether to reconnect to the macro base station or a different macro base station and whether to reconnect with the original local area base station or a different local area base station.

20 Claims, 3 Drawing Sheets

(56) References Cited

U.S. PATENT DOCUMENTS

| | | | |
|---|---|---|---|
| 2011/0294508 A1* | 12/2011 | Min | H04W 76/028 455/436 |
| 2012/0069756 A1* | 3/2012 | Ji | H04W 36/0016 370/252 |
| 2013/0039338 A1* | 2/2013 | Suzuki | H04W 36/0094 370/331 |
| 2013/0182583 A1* | 7/2013 | Siomina | H04W 24/10 370/252 |
| 2013/0260766 A1* | 10/2013 | Lee | H04W 76/068 455/436 |
| 2014/0200001 A1* | 7/2014 | Song | H04W 36/0094 455/436 |
| 2014/0342738 A1* | 11/2014 | Ishii | H04W 28/08 455/436 |
| 2015/0031369 A1* | 1/2015 | Gunnarsson | H04W 36/04 455/438 |
| 2015/0201354 A1* | 7/2015 | Zhang | H04W 36/0022 370/221 |
| 2015/0264620 A1* | 9/2015 | Timus | H04W 36/32 455/440 |
| 2015/0365872 A1* | 12/2015 | Dudda | H04W 36/0055 455/436 |

FOREIGN PATENT DOCUMENTS

| | | |
|---|---|---|
| CN | 102685713 | 9/2012 |
| CN | 102833802 | 12/2012 |

OTHER PUBLICATIONS

Written Opinion of the International Searching Authority for PCT/CN2013/070838 dated Oct. 24, 2013.

International Preliminary Report on Patentability for PCT/CN2013/070838 dated Jul. 28, 2015.

* cited by examiner

US 9,930,581 B2

ADDRESSING COMMUNICATION FAILURE IN MULTIPLE CONNECTION SYSTEMS

RELATED APPLICATION

This application is the U.S. National Stage of and claims priority to and the benefit of International Application Number PCT/CN2013/070838 filed Jan. 22, 2013. The entire contents of the foregoing are hereby incorporated herein by reference for all purposes.

TECHNICAL FIELD

The present invention relates generally to wireless communication. More particularly, the invention relates to mechanisms for managing communication failure in multiple connection systems.

BACKGROUND

As the number of mobile communication devices continues to increase and as new applications for their use continue to be developed, the consumption of data communication resources increases apace. Service providers are constantly endeavoring to increase the data communication capacity they can provide while managing their infrastructure costs. As the demand for data communication services continues to increase, systems come nearer to reaching the capacity of the available communication spectrum. If the capacity of the communication spectrum in an area, such as a wireless network cell, is reached, the addition of infrastructure will not increase the data communication capacity of a service provider maintaining the cell. Therefore, service providers are constantly seeking to increase the efficiency of their communication spectrum usage and to identify new portions of the communication spectrum that can be used.

SUMMARY

In one embodiment of the invention, an apparatus comprises at least one processor and memory storing computer program code. The memory storing the computer program code is configured to, with the at least one processor, cause the apparatus to at least respond to a radio link failure occurring in a dual connection operating mode of a user device connecting to a macro base station and a local area base station by determining if the link failure is a local area base station link failure or a macro base station link failure and, if the link failure is a local area base station link failure, configure a message for transmission to the macro base station, wherein the message comprises at least failure indication and measurement information for a serving local area base station and at least one neighboring local area base station.

In another embodiment of the invention, an apparatus comprises at least one processor and memory storing computer program code. The memory storing the computer program code is configured to, with the at least one processor, cause the apparatus to at least configure a message for transmission from a macro base station to a user device specifying response by the user device to detection of a radio link failure, when the device is operating in a dual connection mode comprising a macro base station link and a local area base station link, detect occurrence of a link failure affecting the user device, and, if the link failure is a failure of a local area base station link, determine if the user device should attempt to establish a new link between one of the original local area base station and a new local area base station.

In another embodiment of the invention, a method comprises responding to a radio link failure occurring in a dual connection operating mode of a user device connecting to a macro base station and a local area base station by determining if the link failure is a local area base station link failure or a macro base station link failure and, if the link failure is a local area base station link failure, configuring a message for transmission to the macro base station, wherein the message comprises at least failure indication and measurement information for a serving local area base station and at least one neighboring local area base station.

In another embodiment of the invention, a method comprises configuring a message for transmission from a macro base station to a user device specifying response by the user device to detection of a radio link failure, when the device is operating in a dual connection mode comprising a macro base station link and a local area base station link, detecting occurrence of a link failure affecting the user device; and, if the link failure is a failure of a local area base station link, determining if the user device should attempt to establish a new link between one of the original local area base station and a new local area base station.

In another embodiment of the invention, a computer readable medium stores a program of instructions. Execution of the program of instructions by a processor configures an apparatus to at least respond to a radio link failure occurring in a dual connection operating mode of a user device connecting to a macro base station and a local area base station by determining if the link failure is a local area base station link failure or a macro base station link failure and, if the link failure is a local area base station link failure, configure a message for transmission to the macro base station, wherein the message comprises at least failure indication and measurement information for a serving local area base station and at least one neighboring local area base station.

In another embodiment of the invention, a computer readable medium stores a program of instructions. Execution of the program of instructions by a processor configures an apparatus to at least configure a message for transmission from a macro base station to a user device specifying response by the user device to detection of a radio link failure, when the device is operating in a dual connection mode comprising a macro base station link and a local area base station link, detect occurrence of a link failure affecting the user device, and, if the link failure is a failure of a local area base station link, determine if the user device should attempt to establish a new link between one of the original local area base station and a new local area base station.

DETAILED DESCRIPTION

Figure 1:
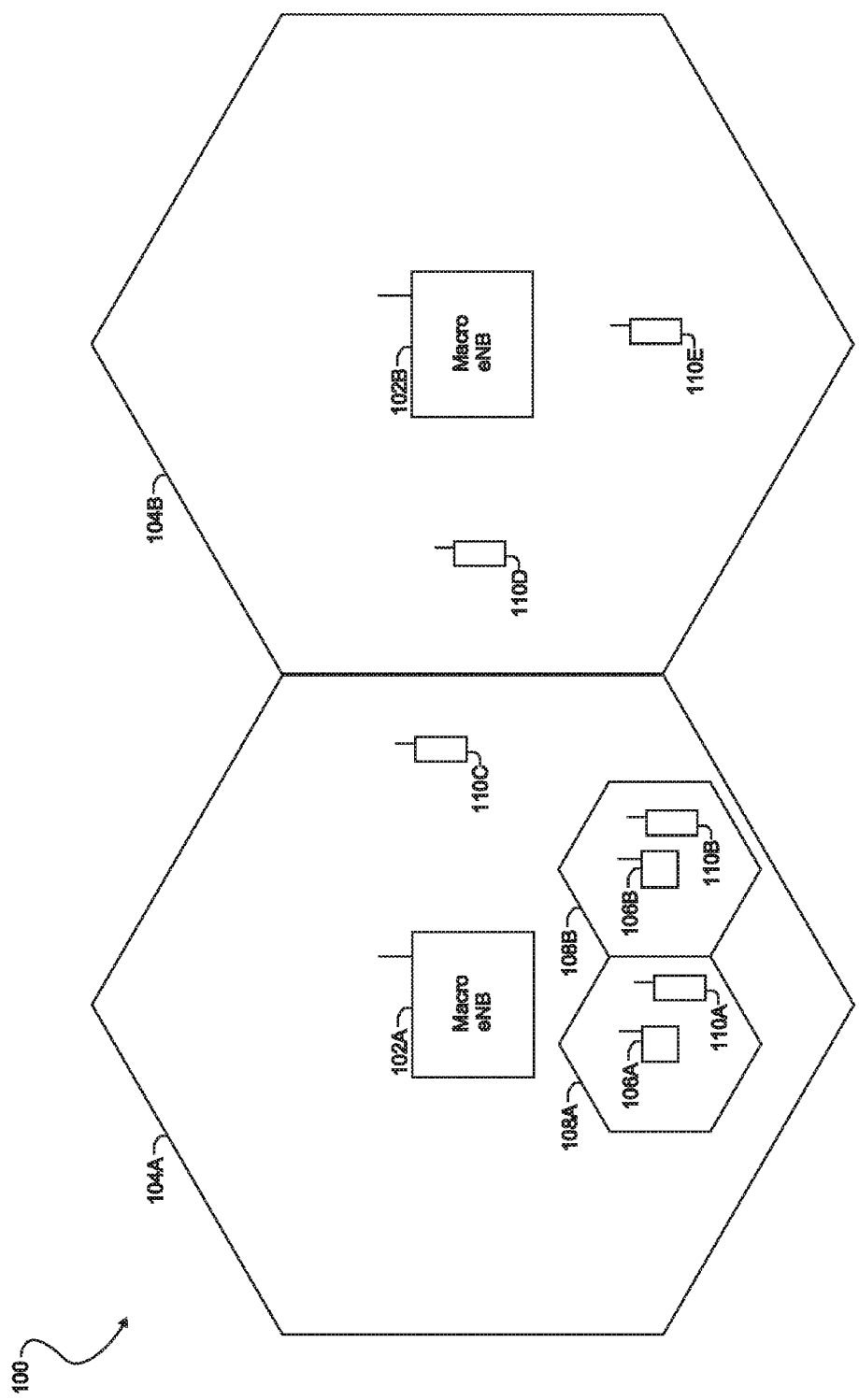
FIG. 1 illustrates wireless network according to an embodiment of the present invention.

One or more embodiments of the present invention recognize that substantial increases in capacity have been achieved and may continue to be achieved by a reduction in size of wireless network cells, resulting from a reduction in range of a network base station. If a base station provides coverage over a smaller range, resources, such as frequency bands, can be used more frequently. One approach to managing the use of smaller cells is the use of multiple connection, allowing a user device, which may be a user equipment (UE) in a third generation preferred partnership (3GPP), 3GPP long term evolution (LTE), or 3GPP LTE-advanced (LTE-A) device. In one approach, a UE may connect to a macro base station, which may be a macro eNB in 3GPP and 3GPP LTE and LTE-A networks, as well as a local area base station, which may be a local area eNB. The macro eNB may provide mobility control to avoid excessive handover procedures and signaling as a UE moves between local area cells. At the same time, local area cells may provide data coverage, to provide a user device with the advantage of a high data rate and a low transmission power due to short distances between the local area base station and the user device.

In the case of a multiple connection, the user device maintains a connection between multiple base stations and uses information relating to both base stations. However, it cannot always be ensured that a perfect backhaul link will exist between the base stations. In addition, an independent scheduler is likely to be deployed at the macro eNB and the local area eNB respectively. In such a case, one base station may not be aware of the other's channel quality, and two base stations will be operated separately most of the time. Important elements of wireless communication are the management of radio link failure and handover failure, and one or more embodiments of the invention recognize that proper management of a wireless connection needs to address radio link failure and handover failure for both a macro link and a local area link, that is, a link between a user device and a macro base station, and a link between a user device and a local area base station.

The failure of a macro link or a local area link brings different considerations. If a user device loses connection with a macro base station, it is not clear if the device should continue to maintain the connection with the local area base station.

If the user device loses connection with the local area base station, one approach is to maintain a connection with the macro base station. The macro base station is able to provide both mobility and data services for a user device. However, if the local area link is lost, the advantages provided by the local area link are also lost. One or more embodiments of the invention therefore recognize that one appropriate response to a failure of a local area link is a quick reestablishment of the connection.

Therefore, in one or more embodiments, the invention provides mechanisms for managing the behavior of a user device that has lost connection with a macro base station, and mechanisms for quick re-establishment of a connection of a user device to a local area base station.

FIG. 1 illustrates a network 100 according to an embodiment of the present invention. The network 100 is presented here with elements and characteristics of a system such as one adhering to third generation preferred partnership long term evolution (3GPP LTE) or 3GPP LTE-advanced (3GPP LTE-A) standards, but it will be recognized that such a presentation is exemplary only and that one or more embodiments of the invention apply generally to measurement reporting in a wireless system with two links operating simultaneously.

The network 100 comprises a plurality of macro base stations, which in an embodiment may suitably be implemented as macro eNodeBs (eNBs) 102A and 102B. The macro eNB 102A defines a macro cell 104A (possibly with multiple carriers in aggregation) and the macro eNB 102B defines a macro cell 104B. The network 100 further comprises local area base stations 106A and 106B, lying within the macro cell 104A and defining local area cells 108A and 108B, respectively, which may be wholly or partly contiguous with the macro cell 104A. For simplicity, the present example does not describe local area eNBs serving areas contiguous with that served by the macro eNB 104B, but it will be recognized that many different combinations of macro eNBs and local area eNBs can be expected to be deployed throughout a network.

The network 100 serves a plurality of user devices, here presented as user equipments (UEs) 110A-110E. The network 100 may employ dual connection or multiple connections, providing for connection by the macro eNB 102A, as well as one or more of the local area base stations, configured as local area eNBs, or LA eNBs, 106A and 106B. For example, the UE 110A may be connected to the eNB 102A, and the LA eNB 106A, and may therefore lie within the cell 104A and the cell 108A. The eNB 102A and the eNB 106A may be serving eNBs for the UE 110A, with the eNB 102A being a primary eNB and the eNB 106A being a secondary eNB. In one exemplary embodiment, the macro eNB 102A provides mobility services for the UE 110A and the local area eNB 106A provides data services. Local area eNBs may conveniently be implemented using 3.5 GHz frequencies, while macro eNBs are more commonly implemented using 2 GHz frequencies. 3.5 GHz frequencies commonly provide up to 100 MHz continuous frequency resources, and can provide for reduced power consumption because of a better channel quality to a local area eNB with a low path loss. Such a higher channel quality can improve spectrum efficiency by providing for a higher re-use factor.

In the present example, as noted above, the UE 110A is connected to the eNB 102A, so that the eNB 102A has a macro link with the UE 110A. The UE 110A is also connected to the LA eNB 106A, so that the LA eNB 106A has a local area link, or LA link, with the UE 110A.

In a dual connection case, particularly a case in which the macro eNB is managing mobility services for the UE and the local area eNB is providing data for the UE, two different radio links exist, both of which are subject to failure. In addition, the different links are used to support different services for the UE, so that different failures have different effects and may call for different responses by the UE.

Therefore, in one or more embodiments of the present invention, if a UE is operating in a dual connection mode, it responds to a radio link failure or handover failure of a link to a local area eNB by sending to its macro eNB a failure indication and a measurement of serving and neighbor eNB conditions without a need for a request from the macro eNB. If the UE loses its connection from its macro eNB, it maintains a local area connection if it is able to reestablish the connection to the same macro eNB. It sends a radio resource control release request to its local area eNB if it is unable to reestablish the connection to the same macro eNB.

Dual connection may suitably be established by the macro eNB. That is, a UE may first establish access to the macro eNB and then, with assistance from the macro eNB, establish a connection with a local area eNB. Such an approach reduces the impact of conditions under which continuous coverage by a local area eNB cannot be assured, and recognizes that searching for a macro eNB (which typically provides relatively broad coverage) is often easier than searching for a local area eNB, which may have a much smaller coverage area.

In one or more embodiments of the invention, may UE may, upon losing connection to a local area eNB, send to its macro eNB a Failure Indication and report to the macro eNB the measurement results of serving and neighbor cell. The Failure Indication may include a reason indication, which may be set to specify that the reason is a radio link failure (RLF), or that the reason is a handover failure (HOF). the report may be performed without a need for the UE to receive a triggering request from the macro eNB.

In one or more additional or alternative embodiments of the invention, an eNB, such as the macro eNB serving the UE, may configure one or more measurement events for "adding a potential candidate cell for dual connection", or, alternatively, such measurement events may be stored by the UE relatively permanently as part of its design configuration. If a UE loses a connection, it may first evaluate its measurement results in terms of identifying a potential candidate cell, and report only measurement results associated with potential candidate cells. In one or more additional or alternative embodiments of the invention, the UE may report a preferred neighboring local area eNB in the same report.

In one or more additional or alternative embodiments of the invention, an eNB may configure two sets of measurement events for one measurement object, with only one set being activated, and with the selection of which set to activate being based on the status of the UE. For example, if a dual connection is present, a UE may evaluate a serving cell related event. If the UE loses connection, it may evaluate the neighboring eNB related event in order to assist link failure recovery or reestablish a new dual connection.

In another embodiment of the invention, if the UE loses a connection with a macro eNB, the UE may suitably determine whether to maintain or release its connection to a local area eNB. The determination may be based on whether a reselection result calls for the selection of the original macro eNB.

If the UE selects the original macro eNB, it may suitably attempt to re-access the macro eNB, but if the UE selects a different macro eNB than the original one, it may decide whether to maintain its original local area connection, or to release the local area connection and establish a new macro connection.

To release the local area connection, the UE may send a radio resource control (RRC) release request to the local area eNB. Such a request may include a selected macro cell ID, release indication, or the like. To maintain the local area connection, the UE will suspend use of the radio bearer being used for the macro connection and resume use of the radio bearer being used for the local area connection.

If the UE experiences a radio link failure or handover failure of its RLF or local area connection at the same time as the failure of the macro connection, The UE may suitably perform radio resource control connection re-establishment only on the macro eNB. Suitably, the UE may indicate to the local area eNB that the connection has failed, with a reason indicating specifying a radio link failure—for example, "RLF".

If a radio link fails, the UE may suitably stop all uplink transmission, other than a random access channel procedure, in the connection that experienced radio link failure. For configured periodic uplink transmissions, such as channel state information, sounding reference signals, and the like, the UE may suitably release such transmissions once a radio link failure occurs on a connection. The UE may also release configured uplink grants, such as semi-persistent scheduling, and also stop non-adaptive retransmission.

Figure 2:
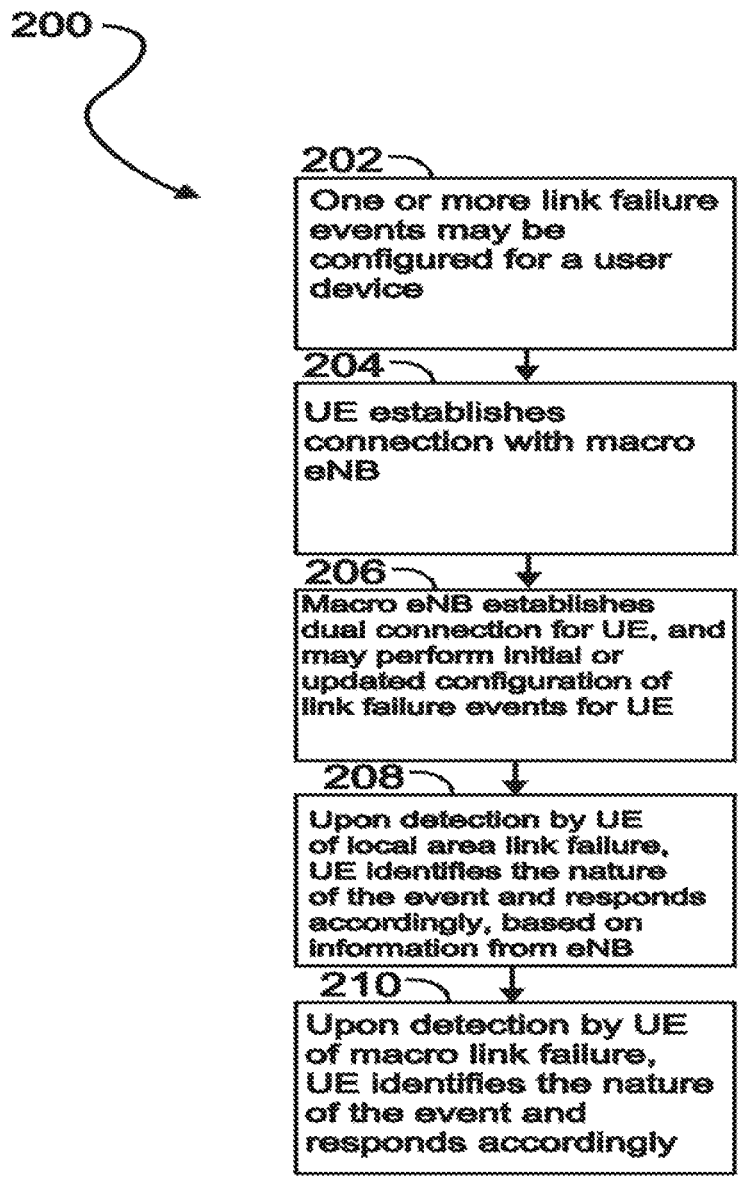
FIG. 2 illustrates a process according to an embodiment of the present invention.

FIG. 2 illustrates a process 200 according to an embodiment of the invention. At step 202, one or more link failure events may be configured for a UE. The link failure events may include radio link failure events or handover events, specifying reporting and actions to be undertaken upon detection of a link failure. Configuration may be accomplished at initial design of the UE, at initial entry into service, or during operation of the UE. At step 204, a UE establishes a connection with a macro eNB. The macro eNB may perform an initial or updated configuration of link failure events for the UE. At step 206, the macro eNB establishes a dual connection for the UE. That is, the macro eNB, to which the UE is already connected, establishes an additional connection for the UE, suitably to a local area base station. The macro eNB suitably provides mobility services for the UE and the local area base station suitably provides data and other communication services. dual connection for a UE is established, suitably by a macro eNB.

At step 208, upon detection by the UE of a local area link failure, the UE identifies the nature of the event and responds accordingly, as described above in the discussion of FIG. 1. For example, the UE may perform measurement results in terms of identifying a potential candidate eNB, may report a preferred neighboring local area cell, may select one of two or more sets of measurement events based on status of a measurement object, such as whether the event indicates a serving eNB related event or a neighboring eNB related event. The response may be determined at least in part based on information, such as cell selection information, received from the macro eNB.

At step 210, upon detection of connection loss with a macro eNB, the UE identifies the nature of the event and responds accordingly, as described above in the discussion of FIG. 1. For example, the UE may determine whether to maintain or to release its connection to a local area eNB and may determine whether to maintain or release its connection to its original local area eNB.

Figure 3:
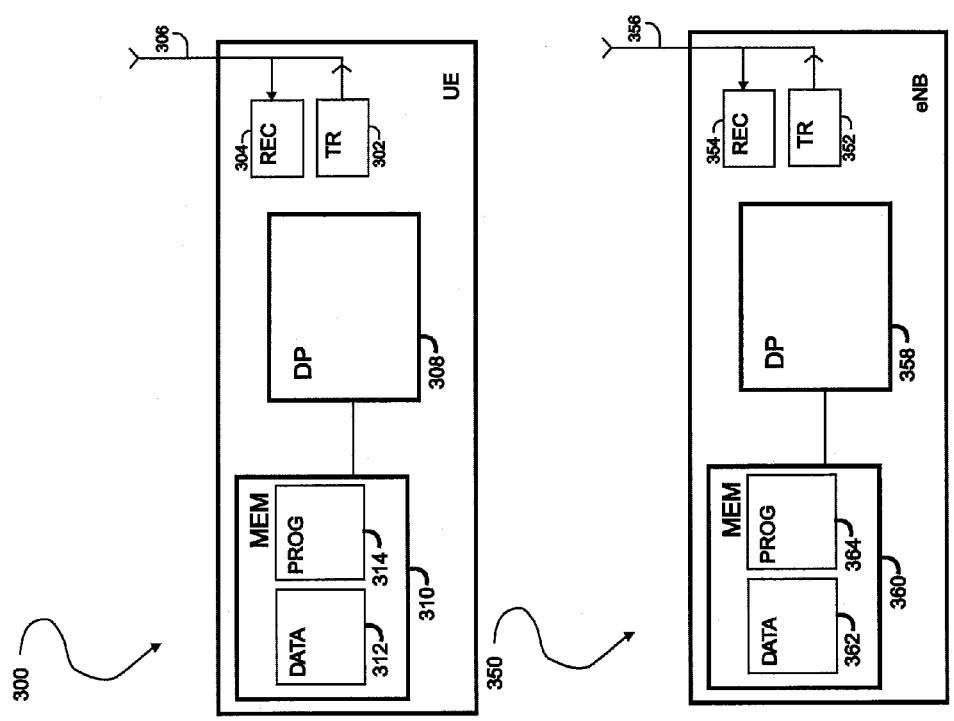
FIG. 3 illustrates elements according to an embodiment of the present invention.

Reference is now made to FIG. 3 for illustrating a simplified block diagram of details of an exemplary device, here implemented as a user equipment (UE) 300 and eNB 350, suitable for wireless network communication, which may be used to carry out an embodiment of the invention.

The UE 300 includes a transmitter 302 and receiver 304, antenna 306, one or more data processors (DPs) 308, and memory (MEM) 310 that stores data 312 and one or more programs (PROG) 314. The eNB 350 includes a transmitter 352 and receiver 354, antenna 356, one or more data processors (DPs) 358, and memory (MEM) 360 that stores data 362 and one or more programs (PROG) 364.

At least one of the PROGs 314 and 364 is assumed to include program instructions that, when executed by the associated DP, enable the electronic devices to operate in accordance with the exemplary embodiments of this invention as was detailed above in detail.

In general, the exemplary embodiments of this invention may be implemented by computer software executable by the DP 306 or 356, or by hardware, or by a combination of software and/or firmware and hardware. The interactions between the major logical elements should be clear to those skilled in the art for the level of detail needed to gain an understanding of the broader aspects of the invention beyond only the specific examples herein. It should be noted that the invention may be implemented with an application specific integrated circuit ASIC, a field programmable gated array FPGA, a digital signal processor or other suitable processor to carry out the intended function of the invention, including a central processor, a random access memory RAM, read only memory ROM, and communication ports for communicating, for example, channel bits as detailed above.

In general, the various embodiments of the UE 300 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 310 and 360 may be of any type suitable to the local technical environment and may be implemented using any suitable data storage technology, such as semiconductor based memory devices, magnetic memory devices and systems, optical memory devices and systems, fixed memory and removable memory. The DP 308 may be of any type suitable to the local technical environment, and may include one or more of general purpose computers, special purpose computers, microprocessors, digital signal processors (DSPs) and processors based on a multi-core processor architecture, as non-limiting examples.

At least one of the memories is assumed to tangibly embody software program instructions that, when executed by the associated processor, enable the electronic device to operate in accordance with the exemplary embodiments of this invention, as detailed by example above. As such, the exemplary embodiments of this invention may be implemented at least in part by computer software executable by the controller/DP of the UE 300 or the eNB 350, or by hardware, or by a combination of software and hardware.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

What is claimed is:

1. An apparatus comprising:
    at least one processor;
    memory storing computer program code which, when executed by the at least one processor, causes the apparatus to:
    respond to a radio link failure occurring to a user device operating in a dual connection operating mode in which the user device is connected to a macro base station and a local area base station by determining if the radio link failure is a local area base station link failure or a macro base station link failure; and
    transmit, responsive to that the radio link failure is a local area base station link failure, a message to the macro base station, wherein the message comprises both a failure indication of the local area base station link failure and measurement information of conditions of a serving local area base station and at least one neighboring local area base station.

2. The apparatus of claim 1, wherein determination if the link failure is a local area base station link failure or a macro base station link failure is performed based on simultaneous monitoring by the user device of conditions tending to lead to failure of the macro base station link, and monitoring of the local area base station link, while the user device is in a dual connection operating mode.

3. The apparatus of claim 2, wherein monitoring by the user device of conditions tending to lead to failure of the macro base station link comprises at least one of monitoring to detect poor channel quality, monitoring to detect RLC retransmission failure, and monitoring to detect random access channel procedure failure.

4. The apparatus of claim 1, wherein the failure indication includes information identifying the nature of the failure as a radio link failure.

5. The apparatus of claim 1, wherein the failure indication includes information identifying the nature of the failure as a handover failure.

6. The apparatus of claim 1, wherein the memory stores the computer program code which, when executed by the at least one processor, causes the apparatus to:
    configure the message by evaluating measurement results to determine if the measurement results indicate at least one potential candidate base station identified for selection and selecting for reporting only measurement results indicating a potential candidate base station.

7. The apparatus of claim 1, wherein the memory stores the computer program code which, when executed by the at least one processor, causes the apparatus to:
    configure the message by identifying a preferred candidate cell for inclusion in the message.

8. The apparatus of claim 1, wherein the memory stores the computer program code which, when executed by the at least one processor, causes the apparatus to:
    configure the message by selecting one of at least two measurement events for which results are to be included in the message, wherein one of the at least two measurement events is selected based on detection of a condition associated with the one of the at least two measurement events.

9. The apparatus of claim 1, wherein the memory stores the computer program code which, when executed by the at least one processor, causes the apparatus to:
    if the link failure is a macro base station link failure, determine if the user device is to re-establish connection with the original macro base station;
    if the user device is to re-establish connection with the original macro base station, control the user device to attempt to re-access the original macro base station; and
    if the user device is to establish connection with a different macro base station, control the user device to determine whether the original local area connection is to be maintained.

10. The apparatus of claim 9, wherein determining whether the original local area connection is to be maintained is based at least in part on a cell reselection analysis.

11. A method comprising:
    responding to a radio link failure occurring to a user device operating in a dual connection operating mode in which the user device is connected to a macro base station and a local area base station by determining if the radio link failure is a local area base station link failure or a macro base station link failure; and transmitting, responsive to that the radio link failure is a local area base station link failure, a message to the macro base station, wherein the message comprises both a failure indication of the local area base station link failure and measurement information of conditions of a serving local area base station and at least one neighboring local area base station.

12. The method of claim 11, wherein the failure indication includes information identifying the nature of the failure as a radio link failure.

13. The method of claim 11, wherein the failure indication includes information identifying the nature of the failure as a handover failure.

14. The method of claim 11, further comprising:
configuring the message by evaluating measurement results to determine if the measurement results indicate at least one potential candidate base station identified for selection and selecting for reporting only measurement results indicating a potential candidate base station.

15. The method of claim 11, further comprising:
configuring the message by identifying a preferred candidate cell for inclusion in the message.

16. The method of claim 11, further comprising:
configuring the message by selecting one of at least two measurement events for which results are to be included in the message, wherein one of the at least two measurement events is selected based on detection of a condition associated with the one of the at least two measurement events.

17. A non-transitory computer readable medium storing instructions, the instructions, when executed by a processor, cause an apparatus to:

respond to a radio link failure occurring to a user device operating in a dual connection operating mode in which the user device is connected to a macro base station and a local area base station by determining if the radio link failure is a local area base station link failure or a macro base station link failure; and transmit, responsive to that the radio link failure is a local area base station link failure, a message to the macro base station, wherein the message comprises both a failure indication of the local area base station link failure and measurement information of conditions of a serving local area base station and at least one neighboring local area base station.

18. The non-transitory computer readable medium of claim 17, wherein the failure indication includes information identifying the nature of the failure as a radio link failure.

19. The non-transitory computer readable medium of claim 17, wherein the failure indication includes information identifying the nature of the failure as a handover failure.

20. The non-transitory computer readable medium of claim 17, wherein the instructions when executed by the one processor, causing the apparatus to:

configure the message by evaluating measurement results to determine if they indicate at least one potential candidate base station identified for selection and selecting for reporting only measurement results indicating a potential candidate base station.

* * * * *